United States Patent [19]

Schneider et al.

[11] Patent Number: 5,528,684
[45] Date of Patent: Jun. 18, 1996

[54] COAXIAL CABLE INTERFACE INCLUDING SECURITY COVER FOR DEMARCATION POINT

[75] Inventors: Pina R. Schneider, Holmdel; Frank S. Siano, Spotswood; Anthony L. Nieves, Belmar; Patrick J. Epple, Spring Lake, all of N.J.

[73] Assignee: ANTEC Corp., Rolling Meadows, Ill.

[21] Appl. No.: 300,398

[22] Filed: Sep. 2, 1994

[51] Int. Cl.⁶ .................................................. H04M 11/00
[52] U.S. Cl. .............................. 379/399; 379/412; 348/8
[58] Field of Search .................................... 379/326, 397, 379/399, 412, 90, 53; 348/6, 7, 8, 10; 439/578, 579, 580, 581, 582, 583, 498, 92; 361/601, 602, 641, 823, 826, 827, 828

[56] References Cited

U.S. PATENT DOCUMENTS

| | | | |
|---|---|---|---|
| 3,610,810 | 10/1971 | Fribley, Jr. | 361/641 X |
| 3,760,130 | 9/1973 | Ross et al. | 361/641 X |
| 3,989,333 | 11/1976 | Cauldwell | 361/641 X |
| 4,133,021 | 1/1979 | King et al. | 361/660 |
| 4,266,266 | 5/1981 | Sanner | 361/643 |
| 4,578,702 | 3/1986 | Campbell, III | 348/6 X |
| 4,764,849 | 8/1988 | Khan | 361/827 |
| 4,785,376 | 11/1988 | Dively | 361/641 X |
| 4,794,490 | 12/1988 | Epstein | 361/827 |
| 4,800,588 | 1/1989 | Poster, Jr. | 379/412 |
| 4,873,600 | 10/1989 | Vogele | 361/823 |
| 4,887,187 | 12/1989 | Nickola | 361/826 X |
| 4,890,318 | 12/1989 | Crane et al. | 379/399 |
| 4,912,615 | 3/1990 | Bluband | 361/827 |
| 4,945,559 | 7/1990 | Collins et al. | 379/399 |
| 4,949,376 | 8/1990 | Nieves et al. | 379/399 |
| 4,979,209 | 12/1990 | Collins et al. | 379/399 |
| 5,117,122 | 5/1992 | Hogarth et al. | 307/140 |
| 5,130,893 | 7/1992 | Straate et al. | 361/728 |
| 5,160,271 | 11/1992 | Franks, Jr. | 439/92 |
| 5,184,279 | 2/1993 | Horn | 361/641 |
| 5,196,988 | 3/1993 | Horn | 361/651 |
| 5,247,347 | 9/1993 | Litteral et al. | 348/14 X |
| 5,327,114 | 7/1994 | Straate et al. | 340/286.06 |
| 5,359,654 | 10/1994 | Jensen et al. | 379/399 X |
| 5,363,432 | 11/1994 | Martin et al. | 379/90 |

Primary Examiner—Jeffery Hofsass
Assistant Examiner—Scott L. Weaver
Attorney, Agent, or Firm—R. Gale Rhodes, Jr.

[57] ABSTRACT

Coaxial cable connector for interconnecting coaxial cable signals to a receiver and which provides a coaxial cable demarcation point for permitting a reasonable determination of whether the failure of the receiver to function is due to the failure of the receiver to receive the signals or is due to the failure of the receiver itself to function. The connector may also include telephone interconnecting means for interconnecting at least one incoming telephone line to at least one telephone customer line and for providing a telephone demarcation point therebetween to permit the a reasonable determination of whether a fault exists on the telephone subscriber's line or the incoming telephone company line.

12 Claims, 4 Drawing Sheets

COAXIAL CABLE INTERFACE INCLUDING SECURITY COVER FOR DEMARCATION POINT

BACKGROUND OF THE INVENTION

This invention relates to apparatus for connecting coaxial cable signals from a source or provider thereof to a receiver thereof, such as for example, apparatus for connecting incoming cable television signals to a television set which television set, for example may be the television set of a telephone company subscriber or customer, and which apparatus also may be used for connecting incoming telephone company wiring or lines to telephone subscriber or customer premises wiring or lines.

As used hereinafter and in the appended claims, the term "coaxial cable signals" means any data, voice or video signal, such as for example and not by way of limitation, cable television signals, telephone signals, telegraph signals, video signals, and the like, capable of being carried or transmitted over a coaxial cable.

Numerous telephone network interface apparatus are known to the art for being mounted at a multiple dwelling such as an apartment house or condominium and which telephone network interface apparatus are for connecting one or more incoming telephone lines, typically a plurality of incoming telephone lines, to one or more telephone subscriber's or customer's telephones located at various apartments or condominiums comprising the multiple dwelling. Also known to the art are telephone network interface apparatus including one or more individual subscriber line modules, typically a plurality of such modules, with each individual subscriber line module for connecting one incoming telephone company line to one of the telephone customer's telephones. Such individual subscriber line modules, as known to the art, provide a demarcation point between a telephone subscriber's or customer's line and an incoming telephone line to facilitate the determination of whether a fault exists on the telephone customer or subscriber's line or the incoming telephone company line; this demarcation point is referred to hereinafter and in the appended claims as a telephone demarcation point. Such telephone network interface apparatus and the individual subscriber line modules, as is also known to the art, are typically located in a common area, such as the basement of the apartment house or condominium, whereby a telephone repairman can make a ready determination of whether or not such fault exists on the telephone subscriber's line or the incoming telephone line whether the telephone subscriber or customer is home or not; such individual subscriber line module also permits the telephone customer or subscriber to make the determination of whether a fault exists on the telephone customer or subscriber's line or the incoming telephone company line. Examples of such telephone network interface apparatus and individual subscriber line modules are disclosed in U.S. Pat. No. 4,945,559, patented Jul. 31, 1990, entitled TELEPHONE NETWORK INTERFACE APPARATUS, and U.S. Pat. No. 4,979,209, patented Dec. 18, 1990, entitled INDIVIDUAL SUBSCRIBER LINE MODULE; Thomas J. Collins et al. are inventors of both patents and both patents are assigned to the same assignee as the present invention. These patents are incorporated herein by reference as if fully reproduced herein and U.S. Pat. No. 4,979,209 is referred to hereinafter as the "'209 patent."

With regard to one example of the coaxial cable signals defined above, cable television signals are typically transmitted to a multiple dwelling over an optical fiber line which terminates at an optical network unit typically located curbside to the above-noted multiple dwelling. Typically a plurality of coaxial cables run from the optical network unit to the above-noted individual apartments or condominiums to connect the incoming cable television signals directly, or through a cable television channel selector, to the individual television sets of the cable television customers residing in the apartments or condominiums. Should one of such television sets fail to provide a television picture and audio signals or sound, a question arises in the mind of the television customer as to whether the television set is not working, i.e. whether the television set itself is functioning, or whether cable television signals are not being received by the set. The television customer typically calls the cable television company and reports the failure and then arrangements must be made to coordinate the time at which a cable television repairman can come to the television customer's apartment or condominium with the time at which the television customer is home. This is particularly difficult due to the fact that cable television repairmen typically work 8:00 or 9:00 a.m. to 5:00 p.m., and television customers, including husbands and wives, typically also work 8:00 or 9:00 a.m. to 5:00 p.m.

Accordingly, and with further regard to the cable television signals example, there exists a need in the art for apparatus for interconnecting a television customer's television set to incoming cable television signals which provides a cable television signal demarcation point between such television set and the source of such cable television signals to permit a cable television repairman to make a reasonable determination as to whether or not the failure of the television set to provide a television picture and sound is due to the television set not working or the failure to receive incoming cable television signals, and to permit such cable television repairman to make such determination while the television customer is not present at the apartment or condominium; this demarcation point is referred to hereinafter and in the appended claims as the coaxial cable demarcation point. Thus, it will be further understood, more broadly, there exists a need in the art for apparatus for interconnecting incoming coaxial cable signals to a receiver of such signals and for providing the coaxial cable demarcation point between the receiver and the source of such signals to permit service personnel associated with the provider of the signals, such as the noted cable television repairman, to make a reasonable determination as to whether or not the failure of the receiver to respond to such signals is due to the failure of the receiver of such receiver itself to function or the failure of the receiver to receive the incoming coaxial cable signals from the provider.

There also exists a need in the art for apparatus providing a coaxial cable demarcation point which permits the customer or customer service personnel associated with the receiver of the coaxial cable signals to make a reasonable determination as to whether or not the failure of the receiver to respond to the signals is due to the failure of the receiver to function itself or is due to the failure of the receiver to receive the incoming coaxial cable signals. By way of further example with regard to cable television signals, there exists a need in the art for cable television network interface apparatus providing such coaxial cable demarcation point and which permits the television customer to make a reasonable determination as to whether or not the failure of the television set to provide a television picture and sound is due to the television set not working or the failure to receive incoming cable television signals. If the determination indicates that the failure is due to the customer's television set not working, the customer has the television set repaired or replaced and avoids a service call from the cable television repairman and its needless attendant cost.

There further exists a need in the art for combination apparatus for connecting one or more incoming telephone company lines to one or more telephone subscribers' or customers' lines and for providing the telephone demarcation points therebetween, and for connecting coaxial cable signals from a source or provider thereof to a receiver thereof, and for providing the coaxial cable signal demarcation point therebetween.

SUMMARY OF THE INVENTION

It is the object of the present invention to satisfy the foregoing needs in the art.

Apparatus satisfying the foregoing needs and embodying the present invention may include coaxial cable connecting apparatus for interconnecting coaxial cable signals to a receiver of the signals and which provides a coaxial cable a demarcation point for permitting a reasonable determination of whether the failure of the receiver to function is due to the failure of the receiver to receive the signals or is due to the failure of the receiver itself to function. The apparatus may also include telephone interconnecting means for interconnecting at least one incoming telephone line to at least one telephone customer line and for providing a telephone demarcation point therebetween to permit the a reasonable determination of whether a fault exists on the telephone subscriber's line or the incoming telephone company line.

DESCRIPTION OF THE PREFERRED EMBODIMENTS

Figure 1:
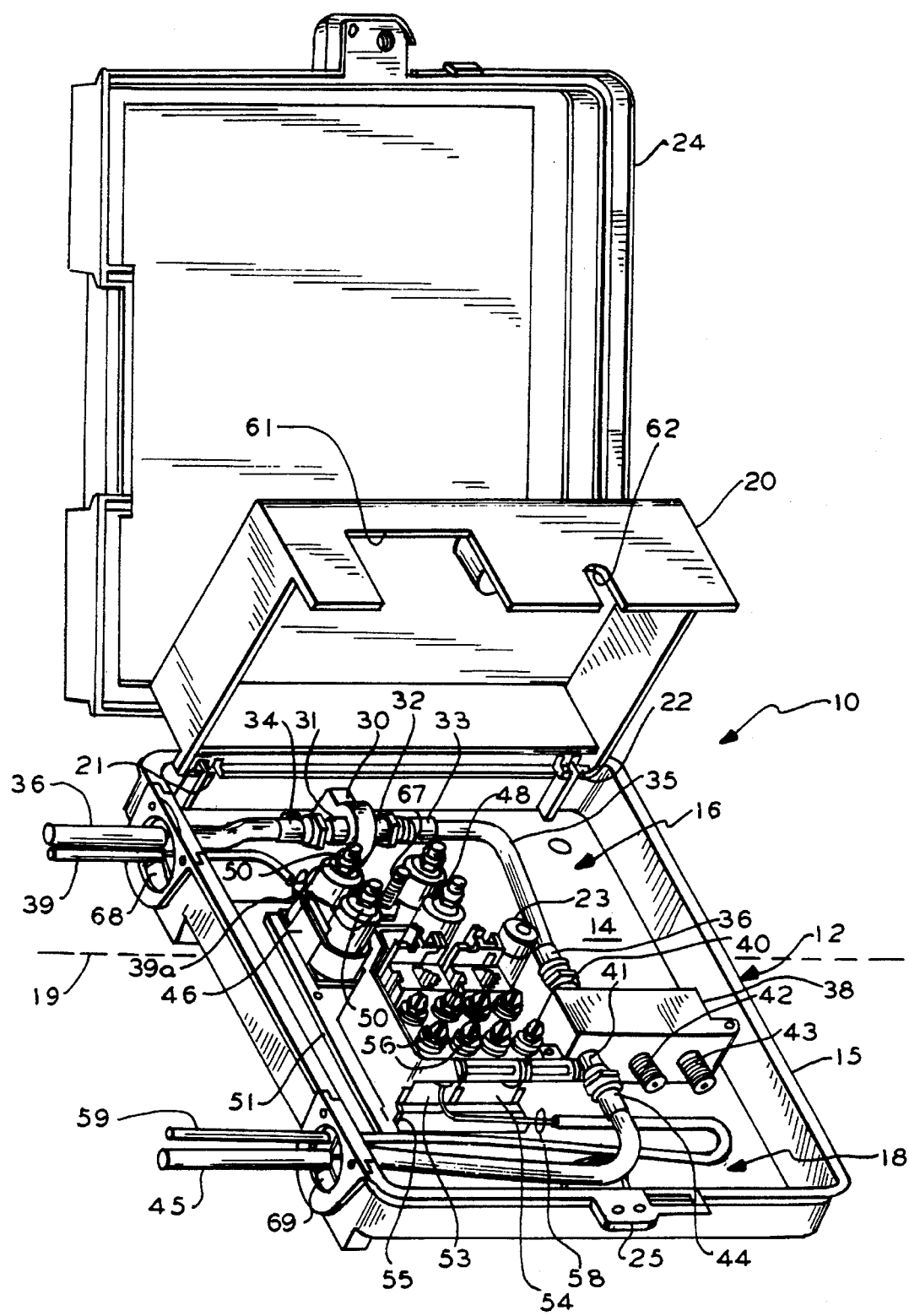
FIG. 1 is a perspective view of network interface apparatus embodying the present invention with the security doors shown in the open positions.

Referring to FIG. 1, network interface apparatus embodying the present invention is shown and indicated by general numerical designation 10. The network interface apparatus 10 will be described embodied as network interface apparatus for interconnecting incoming cable television signals to one or more television sets, and which apparatus also may be used to interconnect one or more incoming telephone lines to one or more telephone subscriber or customer lines. However, it will be understood that the network interface apparatus of the present invention is not limited to interconnecting cable television signals but may be used to interconnect coaxial cable signals as defined above, of which cable television signal are merely one example, to any receiver or receiving means for receiving coaxial cable signals. It will be further generally understood, and as described in detail below, that the network interface apparatus 10 when embodied as network interface apparatus for cable television signals provides the above-noted coaxial cable demarcation point for making a reasonable determination as to whether a failure of a television set to receive incoming cable television signals is due to the failure of the set or the failure of the set to receive the signals, and which apparatus also may be used to interconnect incoming telephone lines and subscriber premises lines and which provides the telephone demarcation point between the incoming telephone company lines and the telephone subscriber lines to permit a telephone company repairman or a telephone company customer to make a reasonable determination as to whether a fault exists on the incoming telephone company line or the telephone subscriber line.

Figure 2:
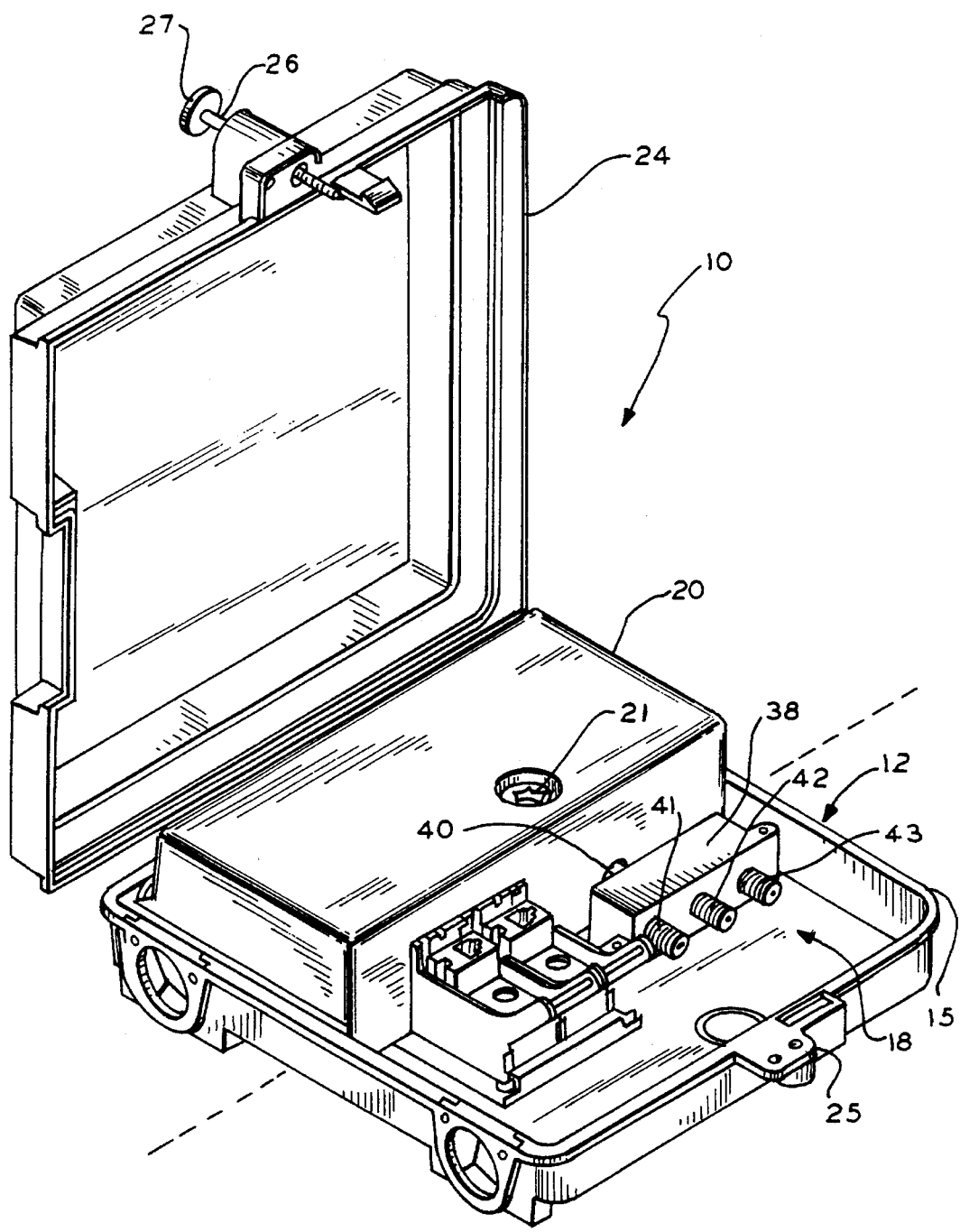
FIG. 2 is a view similar to FIG. 1 but with the inner security door being shown fastened to the base.

Apparatus 10 includes a base indicated by general numerical designation 12 and which base includes a bottom 14 circumscribed by an outwardly or upwardly extending wall 15. Bottom 14 and wall 15 cooperatively provide a compartment for receiving the elements or components shown in FIG. 1 mounted to the bottom 14 and which elements or components are described in detail below. The compartment is divided into a first compartment portion indicated by general numerical designation 16 and a second compartment portion indicated by general numerical designation 18 which compartment division may be readily understood by reference to the diagrammatical dividing line 19. The first compartment portion 16, in the coaxial cable signal context, is a coaxial cable signal provider portion and the second compartment portion 16 is a coaxial cable signal customer portion. A first security cover 20 is mounted hingedly to the base 12 by hinge members 21 and 22 and is for being fastened closed over the first compartment portion 16 as shown in FIG. 2. Cover 20, FIG. 2, is provided with a threaded fastener extending therethrough provided with a head 21 of a relatively uncommon shape whereby the head can be rotated only by a relatively uncommon tool not typically found in a hardware store but which uncommon tool is carried by service personnel, such as a telephone company repairman or a cable television repairman. The threaded fastener having the head 21 shown in FIG. 2 is threaded into the hole formed in the fastening post 23 shown in FIG. 1 which post extends upwardly from the bottom 14. Upon the cover 20 being fastened over the first compartment portion 16 as shown in FIG. 2, the uncommon shape of the head 21 substantially restricts access to the first compartment portion 16 to telephone company and cable television repairmen and substantially prevents access to the first compartment portion 16 by customers such as telephone subscribers or customers and cable television customers.

Apparatus 10 further includes a second security cover 24 also mounted hingedly to the base 12 by hinges, not shown, and which cover 24 is for being fastened closed over the security cover 20 and in particular over the second compartment portion 18. Cover 24 is fastened to the tab 25 provided on the base 12 by a suitable threaded fastener 26 shown in FIG. 2 which threadedly engages a hole formed in the tab 25. The threaded fastener 26 is provided with a head 27 of relatively common shape whereby the head may be readily rotated by a common tool typically found at the hardware store and in the possession of the typical telephone company subscriber or customer or cable television customer, as well as the telephone company and cable television repairmen. However, upon the cover 24 being fastened closed over the base 12, access to the second compartment portion 18 is restricted to the telephone company subscriber or customer, the cable television customer, and the telephone company and cable television repairmen.

Referring again particularly to FIG. 1, a coaxial cable ground block 30, sometimes referred to in the art as a coaxial cable ground insulation or insulator block, is mounted suitably to the bottom 14 such as by screws, not shown, and is for being connected to earth ground as described below and shown in FIG. 10. The ground block 30 may be of the type known to the art and is made of suitable electrically conductive material and includes a pair of opposed female type coaxial cable connectors 31 and 32. Connectors 31 and 32 are interconnected to carry or transmit cable television signals from connector 31 to connector 32. Female coaxial cable connector 31 is for being connected to the male type coaxial cable connector 34 of an incoming coaxial cable 36 carrying, for example in this embodiment, incoming cable television signals from a suitable source thereof.

A cable television signal splitter 38 is mounted suitably to the bottom 14, such as by screws not shown, and includes a female type coaxial cable connector 40 provided on one side thereof and extending into the first compartment portion 16 and a plurality of female type coaxial cable connectors 41, 42 and 43 extending into the second compartment portion 18 and interconnected to the connector 40 to transmit or carry incoming cable television signals from the connector 40 to the connectors 41–43. The splitter 38 in the embodiment is a one to three cable television signal splitter and may be any one of several types of such splitters known to the art.

The apparatus 10 includes an intermediate coaxial cable 35 provided with a male coaxial cable connector 33 interconnected with the female coaxial cable connector 32 and provided with a male coaxial cable connector 36 for being connected to the female coaxial cable connector 40. The intermediate coaxial cable 36 carries or transmits incoming coaxial cable signals from the ground block 30 to the cable television signal splitter 38. It will be understood that the female coaxial cable connector 41 is for being connected to the male coaxial cable connector 44 provided on the end of the outgoing coaxial cable 45 which will be connected to a television set for receiving the incoming cable television signals. Similarly, although not shown, it will be understood that other outgoing coaxial cables may be connected to the connectors 42 and 43 to carry the incoming cable television signals to other television sets.

It will be understood that upon the coaxial cable connectors 31 and 34, 32 and 33, 36 and 40 and 38 and 44 being disconnected, coaxial cable demarcation points are provided therebetween to permit a cable television repairman to make a reasonable determination as to whether the failure of the television set connected to the coaxial cable 45 is due to the failure of the television set to receive the incoming cable television signals or is due to the failure of the television set itself. For example, upon the connectors 31 and 34 being disconnected the cable television repairman can connect suitable test equipment of the type known to the art to the incoming coaxial cable connector 36 and if the equipment receives the incoming coaxial cable television signals a reasonable determination is made that the failure of the television set to receive such signals is due to the failure of the set itself to function; however, if such test equipment does not receive the incoming cable television signals, a reasonable determination is made that the failure of the television set to provide picture and sound is due to the failure of the set to receive the incoming cable television signals. The customer, upon disconnecting connectors 38 and 44 may connect a working television set to the female connector 38 and if the set fails to provide a picture and sound a reasonable determination is made that the failure of the set normally connected to the outgoing coaxial cable 45 to function is due to the failure of the set to receive the incoming cable television signals; on the other hand, if the television set known to be working fails to function upon being connected to the female connector 38, a reasonable determination is made that the failure of the set normally connected to the outgoing coaxial cable 45 to function is due to the failure of the set itself to function.

Referring further to FIG. 1, a pair of telephone protectors 46 and 48, of the type known to the art, and are connected to earth ground as described below and shown in FIG. 4. The protectors include pairs of telephone terminals, such as pair of telephone terminals 50, and are mounted suitably to a mounting member 51, such as by screws not shown, and which mounting member 51 is suitably mounted to the bottom 14 such as by screws not shown. It will be understood that the protectors 46 and 48, and in particular the pairs of telephone terminals, e.g. pair of telephone terminals 50, reside in the first compartment portion 16. The telephone terminals provided on the protectors are for being connected to incoming telephone company lines, for example pair of telephone terminals 50 are connected to pair of conductors 39a of the incoming telephone company line 39.

Also mounted suitably to the mounting member 51 is a pair of individual subscriber line modules 53 and 54. It will be understood that the modules 53 and 54 may be of the same type as the modules 91 shown particularly in FIGS. 7–11 of the '209 patent and that for removable mounting to the member 51 the modules may be provided with the outwardly extending member 114 and downwardly extending member 115 shown particularly in FIG. 10 of the '209 patent, and which outwardly extending member 114 is wedgedly received under the inverted L-shaped member 58 shown in FIG. 1, which member 58 is substantially the same as the upwardly extending inverted L-shaped member 110 shown in FIG. 10 of the '209 patent, and which downwardly extending member 115 is received in holes (not shown) in FIG. 1 formed in the mounting member 51 but which holes are substantially the same as the hole 112 shown in FIG. 10 of the '209 patent. Such mounting, as described in detail in the '209 patent, permits the individual subscriber line modules to be mounted removably to the base member 51 and thereby removably to the network interface apparatus 10.

It will be further understood that the individual subscriber line modules 53 and 54 are provided with pairs of telephone subscriber terminals, sometimes referred to in the art as telephone subscriber wiring terminals, such as for example pair of telephone subscriber wiring terminal 56. The telephone wiring terminals are connected to suitable telephone plugs, such as telephone plugs 101 shown in FIGS. 7–10 of the '209 patent but which plugs are not shown in FIG. 1 for convenience of presentation. The modules 53 and 54 are further provided with telephone jacks, such as telephone jacks 105 shown in FIGS. 7–10 of the '209 patent and which jacks are connected to the pairs of telephone terminals, such as pair of telephone terminals 50 shown in FIG. 1, by conductor pairs not shown in FIG. 1 but which are the same as conductor pairs 107 shown in FIGS. 7, 8 and 10 of the '209 patent; telephone jacks provided on the subscriber line modules 53 and 54 are shown in FIG. 1 but are not numbered for convenience. The pairs of telephone subscriber wiring terminals are for being connected to telephone subscriber lines, for example, pair of telephone subscriber wiring terminals 56 is shown connected to a pair of conductors 58 of the telephone subscriber line or wiring 59. As taught in detail in the '209 patent, it will be understood that the telephone plugs and jacks of the individual subscriber line modules 53 and 54, as described above, are for providing the telephone demarcation point between the incoming telephone company lines and the telephone subscriber lines to permit a reasonable determination to be made as to whether a fault exists on the incoming telephone company line or on the telephone subscriber line. The telephone demarcation point is provided by removing the plug from the jack and the telephone subscriber or a telephone company repairman inserts the plug of a working telephone, or the telephone company repairman inserts the plug of a test set, into the jack. Upon the working telephone or test set receiving the incoming telephone signals, it will be reasonably determined that a fault is present on the telephone subscriber line, and upon the working telephone or test set not receiving the incoming telephone signals it will be reasonably determined that a fault is present on the incoming telephone company line.

Upon the security cover 24 being fastened closed over the base 12, access to the second compartment portion 18 is restricted to the telephone company and cable television repairmen, the telephone customer, the cable television customer and service personnel associated with the cable television customer. Upon the cover 24 being unfastened from the base 12, the telephone company repairman and the telephone customer have access to the telephone demarcation point provided by the modules 53 and 54, the cable television repairman and the cable television customer and service personnel associated with the cable television customer have access to the coaxial cable demarcation point provided by the coaxial cable connectors 38 and 44. Upon the security cover 20 being fastened to the base 12 and closed over the first compartment portion 16, access to the first compartment portion is restricted to the above-noted telephone company personnel or repairmen and repairmen associated with the provider of the incoming cable television signals; however, upon such repair personnel needing access to the first compartment portion 16, such repair personnel first unfasten the first security cover 24 using the common tool referred to above and thereafter use the uncommon tool referred to above to unfasten the security cover 20 from the base 12.

It will be noted that the security cover 20 is provided with indentations 61 and 62 for receiving, respectively, the modules 53 and 54 and the female coaxial cable connector 40 upon the cover 20 being fastened to the base 12.

Figure 3:
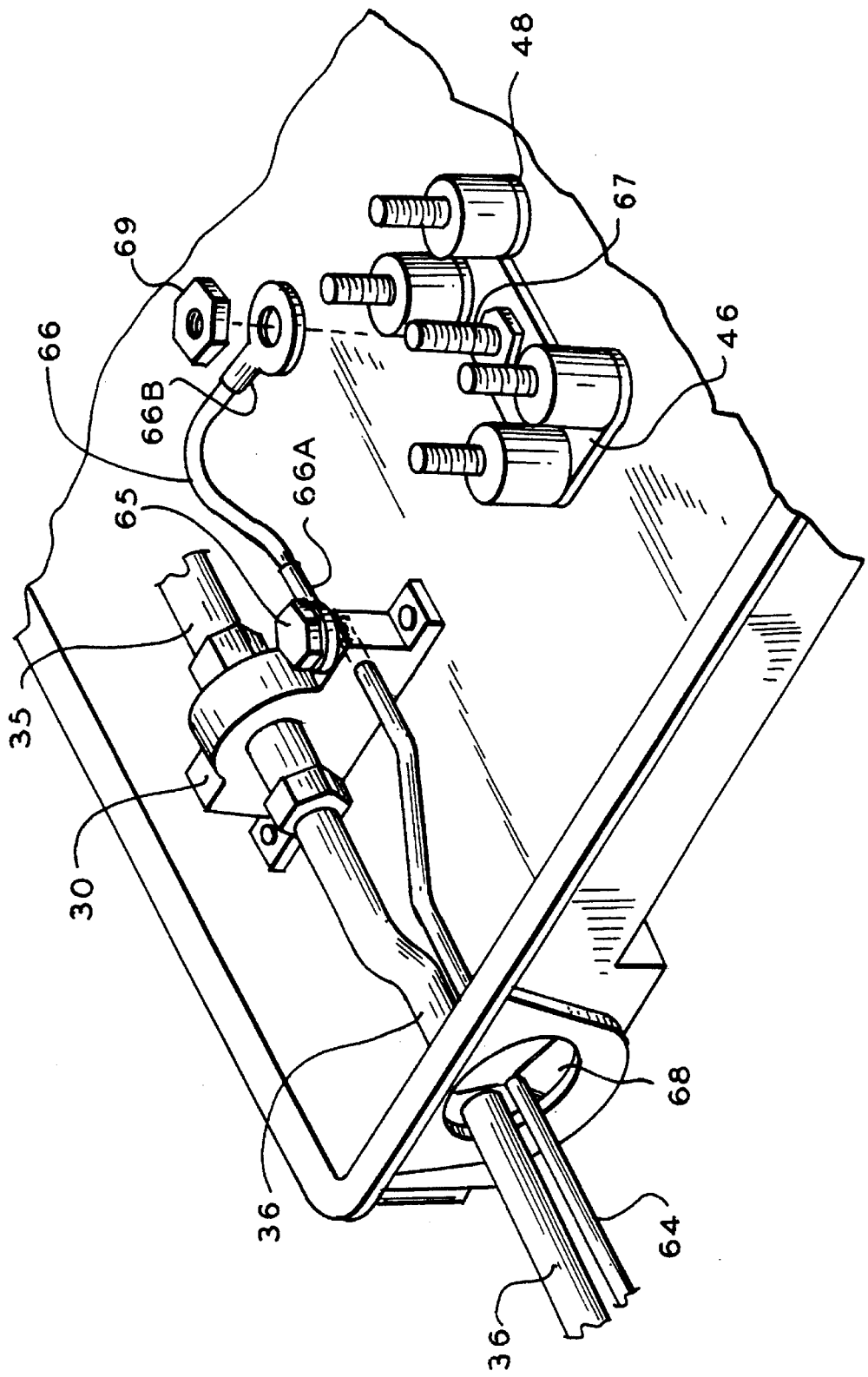
FIG. 3 is a diagrammatical view in perspective illustrating the manner in which the telephone protector and the coaxial cable ground block of the embodiment of FIGS. 1 and 2 are connected to earth ground.

Referring to FIG. 3, the connection of the coaxial cable ground block 30 and the protectors 46 and 48, and thereby the telephone subscriber's line 59 (FIG. 1), to earth ground is illustrated diagrammatically. The electrically conductive ground block 30 is provided with a hole (not shown) into which an end of the ground conductor 64 is inserted and a threaded screw or nut 65 is screwed into a threaded bore 66 to clamp the end of the ground wire or rod 64 to the block 30 thereby mechanically and electrically interconnecting the ground wire 34 and the block 30. A ground conductor 66 has one end 66a connected mechanically and electrically to the ground block 30 by the threaded fastener 65 and the other end 66b connected mechanically and electrically to the ground stud 67 (also shown in FIG. 1) included with the protectors 46 and 48; a threaded nut 69 mechanically secures the end 66b to the ground stud 67 and thereby connects the protectors 46 and 48 to the ground conductor or rod 64. It will be noted that the ground conductor or ground rod 64 extends through the grommet 68, as does the incoming coaxial cable 36, and the ground conductor 64 is connected to a suitable earth ground in the manner known to the art. Due to the closeness of the lines defining the incoming coaxial cable 36 and the incoming telephone company line 39 in FIG. 1, and due to the space constraints of FIG. 1, the ground conductor or rod 64 is not shown in FIG. 1.

Figure 4:
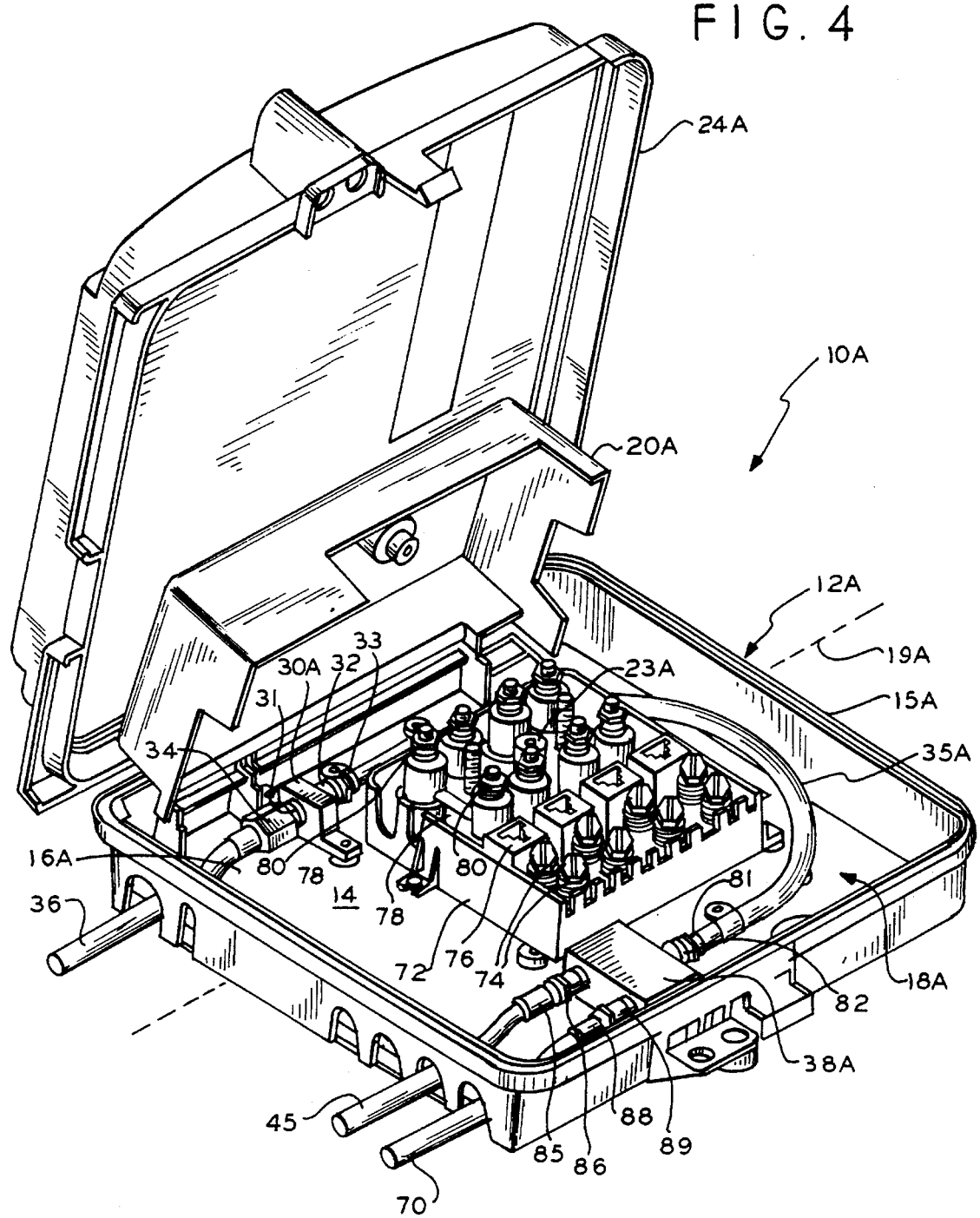
FIG. 4 is a perspective view, similar to FIG. 1, but of an alternate embodiment of the network interface apparatus of the present invention.

Referring now to FIG. 4, an alternate embodiment of the network interface apparatus of the present invention is illustrated and indicated by general numerical designation 10A. Structural elements comprising apparatus 10A which are substantially the same as, and have substantially the same function as, the structural elements comprising network interface apparatus 10 shown in FIGS. 1 and 2 are given the same numerical designations in FIG. 3 plus the addition of the letter A. It also will be understood that apparatus 10A will be described as apparatus for interconnecting incoming cable television signals received over the incoming coaxial cable 36 to television sets which receive such signals and which sets are connected to the outgoing coaxial cables 45 and 70. The primary differences between network interface apparatus 10A of FIG. 3 and the network interface apparatus 10 of FIGS. 1 and 2 are that the cable television signal splitter 30A is mounted entirely in the second compartment portion 18, which compartment portion may be considered to be a telephone subscriber and cable television customer compartment portion, and the telephone protectors, telephone jacks and telephone subscriber wiring terminals are all mounted on a mounting block 72; mounting block 72 may be suitably mounted to the bottom 14 such as by screws. It will be understood that the mounting block 72 is mounted to the bottom 14 in a position such that the pairs of telephone subscriber terminals, such as representative pair of telephone subscriber wiring terminals 74, the telephone jacks, such as representative telephone jack 76 and telephone plugs (not shown but as described above with regard to the embodiment shown in FIGS. 1 and 2 and as shown in the '209 patent), connected to the subscriber terminals, reside in the second compartment portion 18A, and that the telephone protectors, as illustrated by representative telephone protector 78, and the pairs of telephone terminals, as illustrated by representative pair of telephone terminals 80, reside in the first compartment portion 16A as does the ground block 30A.

The pairs of female and male coaxial cable connectors 31 and 34 and 32 and 33 upon being disconnected provide cable television signal demarcation points in the first compartment portion 16A.

The cable television signal splitter 38A in the embodiment shown is a one to two splitter and may be any one of several types of such splitters known to the art. Splitter 38A includes a female coaxial cable connector 81 for being connected to the male coaxial cable connector 82 provided on one end of the intermediate coaxial cable 35A and upon these connectors being disconnected a cable television signal demarcation point is provided in the second compartment portion 18A. The splitter 38A includes female coaxial cable connectors 86 and 89 for being connected respectively to the male coaxial cable connectors 85 and 88 provided on the ends of the outgoing coaxial cables 45 and 70 for carrying the incoming cable television signals to television sets. Upon the pairs of connectors 85 and 86 and 88 and 89 being disconnected, additional cable television signal demarcation points are provided in the second compartment portion 18A.

It will be understood that the above-described cable television signal demarcation points permit the same reasonable determination to be made as to whether television sets connected to the outgoing coaxial cables 45 and 70 are functioning themselves or whether their failure to provide picture and/or sound is due to the failure to receive the incoming cable television signals.

Similarly, it will be understood that the jacks, such as representative jack 76, and a telephone plug (not shown but understood to be connected to the representative pair of subscriber wiring terminals 74) provide the telephone demarcation points described above with regard to the embodiment of the network interface apparatus of the present invention shown in FIGS. 1 and 2.

It will be still further understood that the security cover 20A restricts access to the first compartment portion 16A in the same manner that the security cover 20 of FIG. 1 restricts access to the first compartment portion 16 as described above. Similarly, it will be understood that the security cover 24A restricts access to the second compartment portion 18A in the same manner that the cover 24 restricts access to the first compartment portion 18 shown in FIG. 1.

It will be still further understood that the telephone protectors illustrated by representative telephone protector 78 and the ground block 30A are connected to earth ground by a ground conductor or rod in substantially the same manner that the telephone protectors 46 and 48 and ground block 30 in FIG. 3 are connected to earth ground; due to space constraints in FIG. 4 and for convenience of presentation, such earth ground connections are not shown in FIG. 3.

It will be understood that many variations and modifications may be made in the present invention without departing from the spirit and the scope thereof.

What is claimed is:

1. Network interface apparatus for connecting incoming coaxial cable signals from a provider of the incoming coaxial cable signals to receiving means for receiving the incoming coaxial cable signals, comprising:

base means including a coaxial cable signal provider portion and a coaxial cable signal customer portion;

first coaxial cable signal interconnecting means mounted in said coaxial cable signal provider portion and for being connected to earth ground and for being connected to at least one incoming coaxial cable carrying the incoming coaxial cable signals;

second coaxial cable signal interconnecting means mounted in said coaxial cable signal customer portion, said second coaxial cable signal interconnecting means including first connecting means and second connecting means for being connected to at least one outgoing coaxial cable for carrying the coaxial cable signals to the receiving means, said first and second connecting means being interconnected to carry the incoming coaxial cable signals from said first connecting means to said second connecting means;

intermediate coaxial cable signal connecting means interconnecting said first coaxial cable interconnecting means to said first connecting means to carry the incoming coaxial cable signals to the second coaxial cable signal interconnecting means;

said first coaxial cable signal interconnecting means providing a first demarcation point and said second coaxial cable signal interconnecting means providing a second demarcation point for enabling one to make a reasonable determination of whether a failure of the receiving means to respond to the incoming coaxial cable signals is due to the failure of the receiving means to receive the incoming coaxial cable signals or is due to a failure of the receiving means itself to function, said first demarcation point residing in said coaxial cable signal provider portion and said second demarcation point residing in said coaxial cable signal customer portion; and first security means for being fastened to said base means to restrict access to said first demarcation point to at least service personnel associated with the provider of the incoming coaxial cable signals and second security means for being fastened to said base means to restrict access to said second demarcation point to a customer or customer service personnel associated with the coaxial cable signal receiving means.

2. Network interface apparatus for connecting incoming coaxial cable incoming coaxial cable signals from a provider of the signals to receiving means for receiving the incoming coaxial cable signals, comprising:

base means including a coaxial cable signal provider portion and a coaxial cable signal customer portion;

first coaxial cable signal interconnecting means mounted in said coaxial cable signal provider portion and for being connected to at least one incoming coaxial cable carrying the incoming coaxial cable signals;

second coaxial cable signal interconnecting means mounted in said coaxial cable signal customer portion, said second coaxial cable signal interconnecting means including first connecting means and second connecting means for being connected to at least one outgoing coaxial cable for carrying the incoming coaxial cable signals to the receiving means, said first connecting means and said second connecting means being interconnected to carry the incoming coaxial cable signals from said first connecting means to said second connecting means;

intermediate coaxial cable signal connecting means interconnecting said first coaxial cable signal interconnecting means to said first connecting means to carry the incoming coaxial cable signals to the second connecting means included on said second coaxial cable signal interconnecting means;

said first coaxial cable signal interconnecting means providing a first demarcation point in said coaxial cable signal provider portion for permitting service personnel associated with the provider of the incoming coaxial cable signals to make a reasonable determination as to whether a failure of the receiving means to respond to the incoming coaxial cable signals is due to a failure to receive the incoming coaxial cable signals or is due to a failure of the receiving means itself to function;

said second coaxial cable signal interconnecting means providing a second demarcation point in said coaxial cable signal customer portion for permitting service personnel associated with the provider of the incoming coaxial cable signals and a customer or customer service personnel associated with the receiving means to make a reasonable determination as to whether a failure of the receiving means to respond to the incoming coaxial cable signals is due to the failure of the receiving means to receive the incoming coaxial cable signals or is due to the failure of the receiving means itself to function;

first security means for being fastened over said base means to cover at least said coaxial cable signal provider portion of said base means and for restricting access to said first coaxial cable interconnecting means and the first demarcation point to at least service personnel associated with the provider of the incoming coaxial cable signals; and second security means for being fastened over said base means to cover at least said coaxial cable signal customer portion of said base means and for restricting access to said second coaxial cable signal interconnecting means and the second demarcation point to at least service personnel associated with the provider of the coaxial cable signals and to a customer or customer service personnel associated with the receiving means.

3. Network interface apparatus for interconnecting incoming coaxial cable signals from a provider of the incoming coaxial cable signals to receiving means for receiving the incoming coaxial cable signals and for interconnecting at least one incoming telephone company line to at least one telephone subscriber line, comprising:

base means providing a compartment including a first compartment portion and a second compartment portion;

first coaxial cable signal interconnecting means mounted in said first compartment portion and for being connected to earth ground and for being connected to at least one incoming coaxial cable carrying the incoming coaxial cable signals;

telephone company interconnecting means mounted in said first compartment portion and for being connected to the incoming telephone company line and including protection means for being connected to earth ground to provide protection to the telephone subscriber line;

telephone subscriber interconnecting means mounted in said second compartment portion and for being connected to the telephone subscriber line and to said telephone company interconnecting means to interconnect the incoming telephone line to the telephone subscriber line;

second coaxial cable signal interconnecting means mounted to said base means and including a first portion extending into said first compartment portion and a second portion extending into said second compartment portion, said first portion including first connector means and said second portion provided with second connector means and said first and second connector means interconnected to carry incoming coaxial cable signals from said first connector means to said second connector means, said second connector means for being connected to at least one outgoing coaxial cable to carry the incoming coaxial cable signals to the coaxial cable signal receiving means;

intermediate coaxial cable signal connecting means interconnecting said first coaxial cable signal interconnecting means to said first connector means to carry the incoming coaxial cable signals to the second coaxial cable signal interconnecting means;

said first coaxial cable signal interconnecting means providing a first demarcation point in said first compartment portion and for permitting service personnel associated with the provider of the coaxial cable signals to make a reasonable determination as to whether the failure of the receiving means to respond to the incoming coaxial cable signals is due to a failure of the receiving means to receive the incoming coaxial cable signals or is due to a failure of the receiving means itself to function;

said second coaxial cable signal interconnecting means providing a second demarcation point in said second compartment portion and for permitting service personnel associated with the provider of the incoming coaxial cable signals and the customer or customer service personnel associated with the receiving means to make a reasonable determination as to whether or not a failure of the receiving means to respond to the incoming coaxial cable signals is due to a failure of the receiving means to receive the incoming coaxial cable signals or is due to the failure of the receiving means itself to function;

said telephone subscriber interconnecting means providing a telephone demarcation point in the second compartment portion for permitting telephone company personnel and the telephone subscriber to make a reasonable determination as to whether or not a fault exists on the incoming telephone company line or on the telephone subscriber line;

first security means including a first cover mounted pivotally to said base means and for being fastened over said base means to cover at least said first compartment portion and for restricting access to said first compartment portion to telephone company personnel and to service personnel associated with the provider of the incoming coaxial cable signals; and second security means including a second cover mounted pivotally to said base means and for being fastened over at least said second compartment portion to restrict access to said second compartment portion to telephone company personnel, service personnel associated with the provider of the incoming coaxial cable signals, the customer and customer service personnel associated with the coaxial cable signal receiving means, and to the telephone subscriber.

4. The apparatus according to claim 3 wherein said second coaxial cable signal interconnecting means comprise coaxial cable signal splitter means for splitting the incoming coaxial cable signals into a plurality of incoming coaxial cable signals.

5. Network interface apparatus for interconnecting incoming coaxial cable signals from a provider of the incoming coaxial cable signals to receiving means for receiving the incoming coaxial cable signals and for interconnecting at least one incoming telephone company line to at least one telephone subscriber line, comprising:

base means providing a compartment including a first compartment portion and a second compartment portion;

first coaxial cable signal interconnecting means mounted in said first compartment portion and for being connected to earth ground and for being connected to at least one incoming coaxial cable carrying the incoming coaxial cable signals;

telephone company interconnecting means mounted in said first compartment portion and for being connected to the incoming telephone company line and including protection means for being connected to earth ground to provide protection to the telephone subscriber line;

telephone subscriber interconnecting means mounted in said second compartment portion and for being connected to the telephone subscriber line and to said telephone company interconnecting means to interconnect the incoming telephone company line to the telephone subscriber line;

second coaxial cable signal interconnecting means mounted in said second compartment portion, said second coaxial cable interconnecting means provided with first and second connector means interconnected to carry the incoming coaxial cable signals from said first to said second connector means, said second connector means for being connected to at least one outgoing coaxial cable to carry the incoming coaxial cable signals to the coaxial cable signal receiving means;

intermediate coaxial signal connecting means interconnecting said first coaxial cable signal interconnecting means to said first connector means to carry the incoming coaxial cable signals to the second coaxial cable interconnecting means;

said first coaxial cable signal interconnecting means providing a first demarcation point in said first compartment portion and for permitting service personnel associated with the provider of the incoming coaxial cable signals to make a reasonable determination as to whether a failure of the receiving means to respond to the incoming coaxial cable signals is due to a failure of the receiving means to receive the incoming coaxial cable signals or is due to a failure of the receiving means itself to function;

said second coaxial cable signal interconnecting means providing a second demarcation point in said second compartment portion and for permitting service personnel associated with the provider of the incoming coaxial cable signals and customer or customer service personnel associated with the coaxial cable signal receiving means to make a reasonable determination as to whether or not the failure of the receiving means to respond to the incoming coaxial cable signals is due to the failure of the receiving means to receive the incoming coaxial cable signals or is due to the failure of the receiving means itself to function;

said telephone subscriber interconnecting means providing a telephone demarcation point for permitting telephone company personnel and the telephone subscriber to make a reasonable determination as to whether or not a fault exists on the incoming telephone company line or on the telephone subscriber line;

first security means including a first cover mounted pivotally to said base means and for being fastened over said base means to cover at least said first compartment portion and for restricting access to said first compartment portion to telephone company personnel and to service personnel associated with the provider of the incoming coaxial cable signals; and second security means including a second cover mounted pivotally to said base means and for being fastened over at least said second compartment portion to restrict access to said second compartment portion to telephone company personnel, service personnel associated with the provider of the incoming coaxial cable signals, the customer and customer service personnel associated with the coaxial cable signal receiving means, and the telephone subscriber.

6. The apparatus according to claim 5 wherein said second coaxial cable signal interconnecting means comprise coaxial cable signal splitter means for splitting the incoming coaxial cable signals into a plurality of incoming coaxial cable signals.

7. Network interface apparatus for connecting incoming coaxial cable signals from a provider of the incoming coaxial cable signals to receiving means for receiving the incoming coaxial cable signals, comprising:

base means including a coaxial cable signal provider portion and a coaxial cable signal customer portion;

coaxial cable signal connecting means mounted on said base and including a first coaxial cable connector extending into said coaxial cable signal provider portion and a second coaxial cable connector extending into said coaxial cable signal customer portion, said first coaxial cable connector and said second coaxial cable connector interconnected to carry the incoming coaxial cable signals from said first coaxial cable connector to said second coaxial cable connector; and security means for being fastened to said base over said coaxial cable signal provider portion to restrict access to at least said first coaxial cable connector and said security means provided with at least one inwardly extending indentation for at least partially encircling said first coaxial cable connector upon said security means being fastened to said base.

8. The apparatus according to claim 7 wherein said security means is mounted pivotally to said base and wherein said apparatus includes second security means mounted pivotally to said base and for being fastened to said base over said security means and said coaxial cable signal customer portion to restrict access to at least said second coaxial cable connector.

9. Network interface apparatus for connecting incoming coaxial cable signals from a provider of the incoming coaxial cable signals to receiving means for receiving the incoming coaxial cable signals, comprising:

base means including a coaxial cable signal provider portion and a coaxial cable signal customer portion;

coaxial cable signal connecting means including a body portion mounted on said base in said coaxial cable signal provider portion and including a first coaxial cable connector extending into said coaxial cable signal provider portion and a second coaxial cable connector extending into said coaxial cable signal customer portion, said first coaxial cable connector and said second coaxial cable connector interconnected to carry the incoming coaxial cable signals from said first coaxial cable connector to said second coaxial cable connector; and security means for being fastened to said base over said coaxial cable signal provider portion to restrict access to at least said first coaxial cable connector and said security means provided with at least one inwardly extending indentation for at least partially encircling said first coaxial cable connector upon said security means being fastened to said base.

10. The apparatus according to claim 9 wherein said security means is mounted pivotally to said base and wherein said apparatus includes second security means mounted pivotally to said base and for being fastened to said base over said security means and said coaxial cable signal customer portion to restrict access to at least said second coaxial cable connector.

11. Network interface apparatus for connecting incoming cable television signals from a source of the incoming cable television signals to at least one television set for receiving the incoming cable television signals, comprising:

base means providing a telephone company compartment and a telephone subscriber compartment;

cable television signal connecting means including a body portion mounted on said base in said telephone subscriber compartment, said cable television signal connecting means including a first coaxial cable connector mounted to said body portion and extending into said telephone company compartment and a second coaxial cable connector mounted to said body portion and extending into said telephone subscriber compartment, said first cable television connector and said second cable television connector interconnected to carry the incoming cable television signals from said first coaxial cable connector to said second coaxial cable connector, said first coaxial cable connector for being connected to a first coaxial cable carrying the incoming cable television signals to the cable television signal connecting means and said second coaxial cable connector for being connected to a second coaxial cable carrying the incoming cable television signals away from the cable television signal connecting means;

telephone company connecting means mounted to said base in said telephone company compartment and for being connected to at least one incoming telephone company line;

telephone subscriber connecting means mounted on said base in said telephone subscriber compartment and for being connected to at least one telephone subscriber line, said telephone company connecting means and said telephone subscriber connecting means interconnected to connect the incoming telephone line to the telephone subscriber connecting means;

a first cover mounted pivotally to said base and for being fastened to said base over only said telephone company compartment to restrict access to said telephone company compartment to telephone service personnel and cable television service personnel, said first cover provided with a first indentation for at least partially encircling said first coaxial cable connector and a second indentation for at least partially encircling said telephone subscriber connecting means; and a second cover mounted pivotally to said base and for being fastened to said base over said first cover and over said telephone subscriber compartment to restrict access to said telephone subscriber compartment to telephone service personnel, to cable television service personnel, to a customer associated with the television set and to a telephone subscriber associated with said telephone subscriber line.

12. The apparatus according to claim 11 wherein said apparatus is for connecting the incoming cable television signals to at least two television sets, and wherein said cable television signal connecting means comprises cable television splitter means for splitting the incoming cable television signals into at least two incoming cable television signals, wherein said cable television splitter means includes a third coaxial cable connector mounted to said body and extending into said telephone subscriber compartment and for being connected to a third coaxial cable carrying the incoming cable television signals away from the cable television splitter means.

\* \* \* \* \*